May 13, 1947. H. W. PETERS ET AL Re. 22,879
BEVERAGE PRODUCTION
Original Filed Jan. 5, 1942
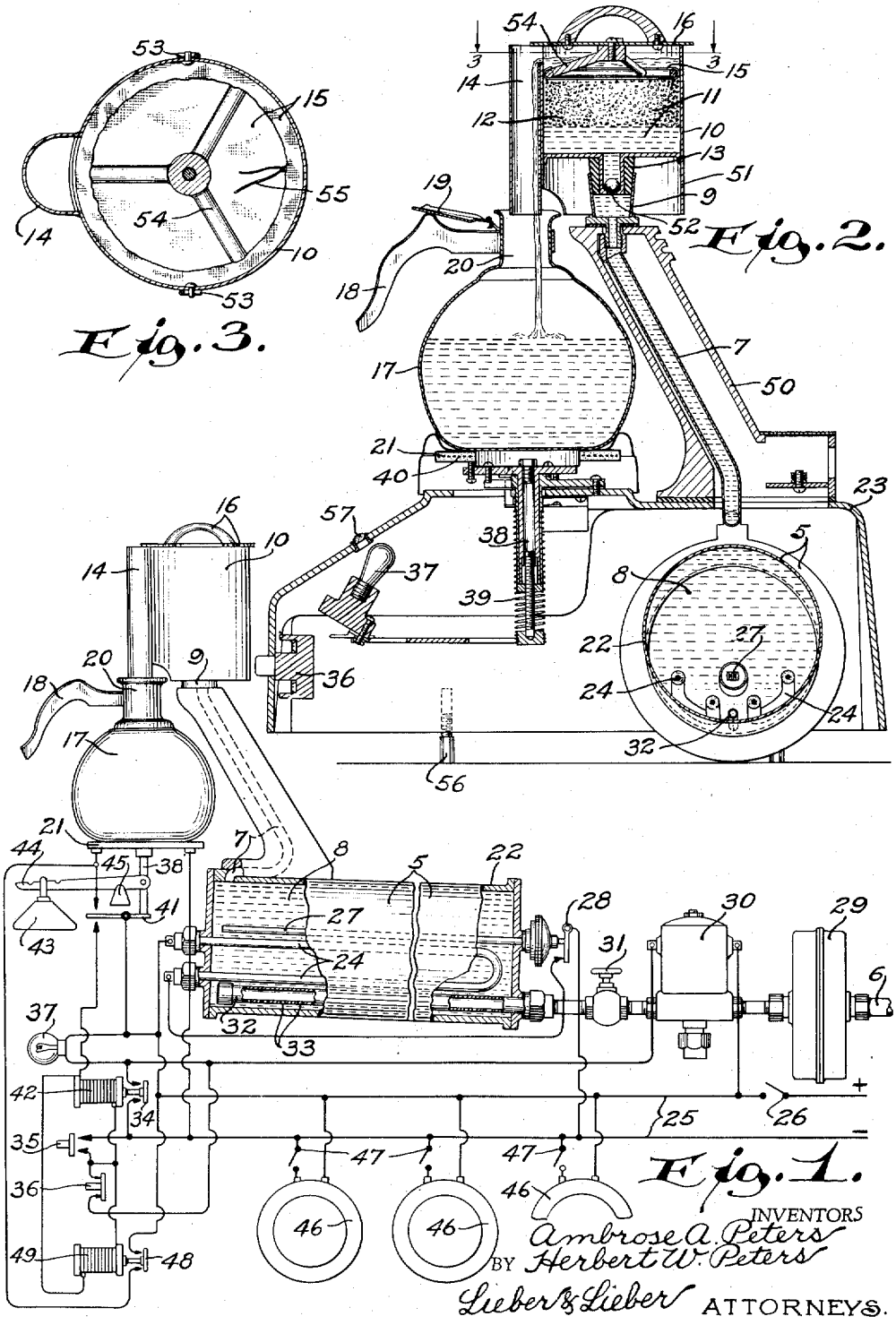

Reissued May 13, 1947

Re. 22,879

UNITED STATES PATENT OFFICE 22,879

BEVERAGE PRODUCTION

Herbert W. Peters, Milwaukee, Wis., and Ambrose A. Peters, deceased, late of Milwaukee, Wis., by Herbert W. Peters, assignee Original No. 2,346,389, dated April 11, 1944, Serial No. 425,662, January 5, 1942. Application for reissue February 12, 1945, Serial No. 577,399½

16 Claims. (Cl. 99—282)

Our present invention relates generally to improvements in the art of producing beverages such as hot coffee, tea or the like, and relates more specifically to various improvements in the construction and operation of beverage producing devices for automatically and effectively converting granular material and liquid into wholesome beverage.

An object of the present invention is to provide an improved beverage producer which is simple and compact in construction, and which is moreover highly efficient in use.

It has heretofore been proposed as shown in the prior Patent No. 2,190,270, granted February 13, 1940, to Ambrose A. Peters, to provide a coffee making assemblage wherein hot water from a stationary heater is caused to permeate upwardly through successive batches of coffee grounds confined in portable containers which are interchangeably associable with the fixed discharge pipe rising from the heater, and in which the finished coffee may be delivered from the portable permeating containers to any one of several coffee dispensing receptacles through spouts carried directly by the containers. This prior coffee fabricating equipment is especially adapted for use in restaurants and other establishments wherein large quantities of fresh coffee should constantly be available, and while the patented coffee maker has proven highly successful for its intended purpose, it is not sufficiently rapid in action and flexible enough to permit quick and unhampered dispensation of the finished coffee to diverse places or localities of actual consumption, due to the fact that the successive batches treated and produced are relatively large and the final dispensing receptacles are bulky and cannot be readily transported from place to place. The prior system is also somewhat objectionable in that the equipment is relatively cumbersome and difficult to manipulate, and it also lacks sensitive and automatic controls whereby precise uniformity and excellence in final product is always assured.

It is therefore a more specific object of our present invention to provide various improvements in coffee producing apparatus of the general type forming the subject of the prior patent above identified, and which obviates the objectionable features of the prior system while retaining all of the good characteristics thereof.

Another specific object of the present invention is to provide a new and useful system for rapidly producing delicious beverage such as wholesome coffee or tea, in relatively small batches of uniform consistency, which may be quickly and conveniently dispensed with the aid of transparent portable receptacles of standard construction.

A further specific object of this invention is to provide an improved beverage producing assemblage which has enormous capacity while being compact, neat and highly attractive in appearance, and wherein the permeating operation is most effectively accomplished and is subject to automatic control.

Still another specific object of our invention is to provide an improved coffee maker wherein a succession of relatively small batches of granular coffee can be rapidly and effectively treated for extraction of the wholesome ingredients to produce delicious coffee beverage in correspondingly small and readily dispensable batches, and in which the grounds containers and the final coffee urns may be conveniently applied to or removed from the machine.

An additional specific object of the invention is to provide an improved device for making coffee or similar beverages in an expeditious manner, at minimum cost, and with utmost safety to the operator.

These and other specific objects and advantages of the present invention will be apparent from the following detailed description.

A clear conception of the several features constituting the present improvement, and of the mode of constructing and operating beverage producers built in accordance with the invention, may be had by referring to the accompanying drawing in which like reference characters designate the same or similar parts in the various views.

Fig. 1 is a diagram showing the improved assemblage and the controls thereof;

Fig. 2 is an enlarged central vertical section through one of the improved beverage grounds containers and a standard beverage dispensing receptacle, and a transverse vertical section through the water heater and supporting base; and Fig. 3 is a further enlarged transverse section through one of the grounds containers, taken along the line 3—3 of Fig. 2.

While the invention has been shown and described herein as being especially applicable to the production of coffee beverage, it is not our desire or intent to thereby unnecessarily restrict the scope or utility of the improvement which is applicable more generally to the production of various kinds of permeated beverages.

Referring to the drawing forming a part of this specification, the improved beverage producing system shown therein by way of illustration comprises in general, a stationary electrically energized water heater 5 having a valve controlled supply pipe 6 communicating with any desirable fresh water pressure source and a fixed hot water discharge pipe 7, the latter rising at an inclination from the uppermost portion of the heating chamber 8 and having a tapered socket 9 at its upper extremity; a plurality of interchangeably similar containers 10 each having an inner central compartment 11 for confining a batch of granular beverage producing material 12 and being provided at its lower end with a central tapered nipple or plug 13 adapted to frictionally engage the stand pipe socket 9, while its upper end is provided with a down spout 14 communicating with the top of the compartment 11 and disposed closely adjacent to the outer side wall of the container 10; a removable filter 15 carried by a detachable closure cap or cover 16 associated with each of the containers 10, the filter 15 being interposed between the spout 14 and the compartment 11; a plurality of interchangeably similar beverage dispensing receptacles 17 each formed symmetrical with respect to a central axis and having a handle 18 and a cover 19 associated with the upper neck portion 20 thereof; and a support 21 for the receptacles 17 located in central alinement with the container spout 14 and laterally of the inclined riser pipe 7 so as to permit unobstructed disposition of the successive receptacles 17 directly beneath the spouts 14.

The electrically energized water heater 5 which is shown diagrammatically in Fig. 1 and in transverse section in Fig. 2, consists primarily of a slightly inclined cylindrical drum 22 forming a suitable enclosure for the liquid filled heating zone or chamber 8, and being housed and normally concealed within an ornamental frame or base 23; and one or more U-shaped electric heating elements 24 confined within the chamber 8 and connected to a main electric energy supply line 25 having a manually actuated cut-out switch 26 associated therewith. A thermostat 27 is operatively associated with a switch 28 interposed between one terminal of the heating elements 24 and the main line 25, and this switch 28 is adapted to break the heater circuit automatically when the temperature of the water in the chamber 8 reaches a predetermined high value. The fresh water supply pipe 6 communicates with the heater 5 through a strainer 29 and past a magnetically actuated automatic control valve 30 and a manually operable regulating valve 31; and the delivery end of the supply pipe 6 is provided with an elongated tubular end 32 disposed within the lower portion of the heating chamber 8, and having a series of downwardly directed ports or orifices 33 in the bottom thereof. The magnetically actuated fresh water control valve 30 is connected to main line 25 in series with a magnetically actuated switch 34 the operation of which is controllable by means of two push button switches 35, 36 one of which is normally open and the other of which is merely a safety switch and is normally closed, as shown in Fig. 1. An indicating lamp 37 which together with the switches 34, 35, 36 may be mounted within the base 23, is disposed in the circuit which is controlled by the switch 34, and this lamp will light when the switches 34, 35, 36 are all closed, but will extinguish when either of the switches 34, 36 is open. The arrangement of the electrical connections and switches for the water heater 5 is such that when the main switch 26 is closed, the heating elements 24 will be energized and will function to continuously heat the water within the chamber 8; and when the temperature of this water reaches a predetermined high degree the temperature controlled switch 28 will automatically open to de-energize the heating elements 24. When the manually actuated valve 31 has been set to predetermine the rate of flow of the fresh water, and the push button switch 35 is closed, the lamp 37 will light and the magnetically actuated valve 30 will be opened so as to automatically regulate the quantity of fresh water delivered to the heater from the pressure source.

The receptacle support 21 is vertically movably supported upon the base frame 23 by means of a central spindle 38, and is constantly urged toward uppermost position either by means of a lever 44 and weight 43 as in Fig. 1, or by a coil spring 39, as in Fig. 2. The disk-like movable support 21 is provided with an electric heating element 40 one terminal of which is constantly and directly connected with the negative branch of the main line 25, while its opposite terminal is adapted to be interchangeably connected to the positive branch of the main line 25, either through the lever switch 41, or through another magnetically actuated switch 48. This opposite terminal of the heating element 40 is connected to the upper contact of the two way switch 41, and the lower contact of this switch 41 is connected with the solenoid or actuating coil 42 of the magnetic switch 34. A similar solenoid or actuating coil 49 of the magnetic switch 48 is connected in parallel with the coil 42 of the magnetic switch 34, and the pivot terminal of the switch 41 is always connected to the positive branch of the main line 25; so that when the push button switch 35 is closed, both of the magnetic switches 34, 48 will automatically close if the lever switch 41 is engaging its lower contact.

When no receptacle 17 or an empty one, is resting upon the movable support 21, the lower contact of the switch 41 will be closed, and the heating element 40 may then be energized by closing the push button switch 35. Such closing of the switch 35 will immediately cause the magnetic switches 34, 48 to close, and the closing of these magnetic switches will simultaneously illuminate the lamp 37, energize and open the fresh water control valve 30, and energize the heater 40. The apparatus will then function to deliver beverage to the receptacle 17 disposed upon the support 21, and when this receptacle becomes filled to a predetermined extent, the circuit through the lower contact of the switch 41 and through the solenoids 42, 49 will be interrupted to simultaneously open the switches 34, 48, extinguish the lamp 37, and close the magnetic valve 30, thereby stopping the flow of fresh water to the heater 5. The heating element 40 will be momentarily de-energized, but will be quickly re-energized when the lever switch 41 engages its upper contact, and will remain active so long as the liquid filled receptacle 17 is permitted to remain upon the support 21.

The push button switch 35 is of the type wherein when the button is released after closing the circuit controlled thereby, it will automatically return to open position; and the other push button switch 36 is merely a safety switch and may be of the type wherein the circuit controlled thereby is normally closed but will be interrupted by pressing the button. Closing of the switch 35 will therefore energize the coils 42, 49 simultaneously, and these coils will remain energized until either of the switches 36 or 41 are opened, whereupon the switches 34, 48 will automatically open.

The weight of the support 21 and spindle 38 may be counterbalanced either by means of a weight 43 adjustably suspended from a lever 44 which is pivotally attached to the spindle 38 and coacts with a fixed fulcrum 45 as shown in Fig. 1, or by means of an adjustable tension spring 39 as in Fig. 2. Several other stationary electric warmers or heaters 46 for other liquid filled receptacles 17, may also be connected to the main line 25 and provided with independent switches 47 as illustrated in Fig. 1, and these auxiliary heaters 46 may be mounted on the base 23 around the movable support 21 and riser pipe 7.

The upwardly extending laterally inclined hot water discharge pipe 7 which communicates with the uppermost portion of the chamber 8, may be housed within an ornamental and protective tubular casing 50 and the tapered socket 9 may rest upon the upper end of the casing 50 and is rigidly attached to the outlet end of the pipe 7 by a liquid tight joint. The interchangeably similar containers 10 may be formed of sheet metal, and each of these containers 10 is preferably provided with a lower annular apron 51 depending from its chamber 11 and below the lower end of its nipple plug 13, so that the container 10 may be set firmly upon a flat surface without obstruction by the lower plug thereof. The interior of each nipple plug 13 is provided with a one-way ball check valve 52 which will permit hot water to flow freely through the plug and into the percolating chamber 11, but will not permit reverse flow of the liquid, so that no coffee can flow into the heating chamber 8 and the containers 10 may be removed from the socket 9 without danger of dripping. The plugs 13 may be formed of soft rubber and are tapered for snug coaction with the socket 9, but the containers 10 are freely upwardly removable and replaceable by other similar containers. The upper closure covers 16 of the containers 10 may be provided with handles as shown, and are removably attachable to the containers by bayonet joints 53 as shown in Fig. 3. The cloth filter 15 which is suspended from each cover 16, is attachable to a spider 54 secured centrally to the cover, by means of a draw string 55 as shown in Fig. 3, and the filter 15 spans the upper end of the permeating chamber 11 so that no liquid can escape from this chamber to the spout 14 without passing through the filter cloth. The beverage producing material 12 may be coffee grounds, tea leaves, or any other relatively granular beverage stock, and the spouts 14 are disposed closely adjacent to their supporting containers 10 and are open at both ends.

The beverage receiving and dispensing receptacles 17 of which there may be any desired number provided depending upon the capacity of the system, are of relatively standard construction and are ordinarily formed of transparent material such as glass. Each of these receptacles 17 is of sufficient volumetric capacity to hold the beverage which can properly be produced from a single batch of material 12, and when a receptacle 17 has been filled with final beverage, the co-operating container 10 should be removed from the socket 9, and the filled receptacle 17 should be removed from the movable support 21. The housing frame 23 may be provided with adjustable legs 56, and the lamp 37 may be disposed behind a lens 57; and the fresh water supply pipe 6 may be connected to any suitable source of water under pressure.

When it is desired to utilize the improved beverage producing apparatus, the manually operated control valve 31 should be set to produce the desired rate of flow of fresh water from the supply pipe 6 to the heater 5 when the valve 30 has been opened, and the main switch 26 should be closed, thus energizing the heater elements 24. A container 10 having a fresh batch of material 12 therein should then be applied to the stand pipe socket 9, and an empty receptacle 17 should be placed upon the movable support 21 beneath and in vertical alinement with the spout 14 of the receptacle 10. The system will then be in the position shown in the diagram of Fig. 1, and the lamp 37 will be extinguished. By pressing the push button switch 35, the magnetic switches 34, 48 will be closed, the light 37 will be illuminated, and the magnetic control valve 30 will be opened to admit fresh liquid to the chamber 8. This admission of fresh liquid to the bottom of the chamber 8 will force hot liquid through the pipe 7 and the heating elements 24 will then function to heat the liquid in the chamber 8, and as this liquid becomes heated to the proper temperature it will be forced through the pipe 7 and socket 9 past the check vave 52 and through the nipple 13, and will permeate upwardly through the granular material 12 within the chamber 11. When the hot liquid has passed through the material 12 and through the filter 15, it will flow downwardly through the spout 14 as illustrated in Fig. 2 and will gradually fill the receptacle 17. When the liquid in the receptacle 17 has accumulated to such an extent that the weight thereof combined with that of the receptacle is sufficient to lower the support 21 and to momentarily open the switch 41, the solenoid switches 34, 48 will be automatically opened thereby extinguishing the lamp 37 and closing the magnetic water control valve 30. The switch 41 will thereafter close against its upper contact and the heater 40 will remain effective until after the receptacle 17 has been completely filled with beverage and is subsequently removed, whereupon the weight 43 or the spring 39, whichever is used, will become effective to restore the support 21 to its uppermost position with the lever switch 41 closed against its lower contact.

The return of lever switch 41 from its upper to its lower contact deenergizes the heater 40 even though this same lower contact operates to maintain the heater energized while the receptacle 17 is being filled. Thus when the lever switch 41 shifts from the lower contact to the upper contact, it shifts control of the heater 40 so that its return to the lower contact will no longer maintain the heater 40 energized.

The thermostat 27 will prevent excessive rise of the temperature within the chamber 8, and the regulating valve 30 will effectively control the delivery of fresh liquid to this chamber and will stop the delivery when the switches 34, 48 are open and no container 10 is associated with the socket 9, or when the safety switch 36 is opened. When a batch of beverage has been completed, the container 10 may be removed and replaced by a similar container having a fresh batch of material 12 therein, and the filled receptacle 17 may then be removed and placed upon one of the auxiliary heaters 46, whereupon another empty receptacle 17 may be placed upon the support 21. In this manner successive batches of beverage can be quickly and effectively produced and the completed batches may be maintained in heated condition until they are to be dispensed. The system operates automatically and is effectively protected against dangerous pressure conditions within the chamber 8 by the thermostat 27 co-operating with the switch 28. In order to place the system in inactive position, it is only necessary to manipulate the push button switch 36, and when it is desired to de-energize the heating elements 24, it is only necessary to open the main switch 26.

From the foregoing detailed description it will be apparent that our present invention provides an improved beverage producing system which is extremely simple in construction and highly efficient in operation. The performance of the apparatus is automatic except for the replacement of the containers 10 and of the receptacle 17, and the final beverage is automatically maintained in heated condition so that it may be served hot. The improved construction of the heater 5 with its inclined hot water discharge pipe 7, permits the use of standard receptacle 17 which is formed symmetrical with respect to central vertical axes, and also permits the location of the discharge spouts 14 closely adjacent to their containers 10. The provision of the aprons 51 on the containers 10 also permits these containers to be set vertically upon flat surfaces, and the indicator light 37 effectively shows when the system is in operation and beverage is being produced. The operation of the heating element 40 which is associated with the movable support 21 is entirely automatic, and the unit can readily be adjusted for co-operation with relatively rough supporting surfaces by adjustment of the legs 56. The improved beverage producing apparatus has proven highly satisfactory and successful in actual commercial use, and is adapted to produce successive batches of delicious beverage in rapid succession and at extremely moderate cost.

It should be understood that it is not desired to limit this invention to the exact details of construction or to the precise mode of operation, herein shown and described, for various modifications within the scope of the claims may occur to persons skilled in the art.

We claim:

1. In a beverage producer, a stationary water heater having an inclined hot liquid discharge pipe rising from its uppermost portion and provided with a tapered socket at its upper extremity, a container for beverage producing granular material having a tapered lower central plug adapted to fit said pipe socket and being provided with a vertical down spout communicating with the space above said material and disposed closely adjacent to the container wall, and a portable receptacle for finished beverage formed symmetrical with respect to a central vertical axis and being disposable in vertical alinement with said spout and within the space produced by the inclination of said pipe.

2. In a beverage producer, a stationary water heater having an inclined hot liquid discharge pipe rising from its uppermost portion and provided with a tapered socket at its upper extremity, a container for beverage producing granular material having a tapered lower central plug adapted to fit said pipe socket and being provided with a vertical down spout communicating with the space above said material and disposed closely adjacent to the container wall, a support disposed centrally and vertically beneath the delivery end of said spout and extending laterally beneath said pipe and socket, and a portable beverage dispensing receptacle formed symmetrical with respect to a central vertical axis and being disposable upon said support in axial alinement with said spout.

3. In a beverage producer, a water heater having an upwardly directed hot liquid discharge pipe provided with a tapered socket at its upper end, and a granular material beverage producing container having a lower plug formed for snug but removable disposition within said socket, said container having an apron wall depending from its outer wall to a plane beneath said plug.

4. In a beverage producer, a water heater having an upwardly directed hot liquid discharge pipe provided with a tapered socket at its upper end, and a granular material beverage producing container having a lower plug formed for snug but removable disposition within said socket, said container having an apron wall depending from its outer wall to a plane beneath said plug, and said container also having a beverage discharge spout terminating in said plane.

5. In a beverage producer a stationary water heater having a hot liquid discharge pipe rising from its uppermost portion and extending laterally and provided with a readily separable connector at its upper extremity, a container for beverage producing granular material having an interfitting connecter adapted to fit the connecter on said pipe and provided with a discharge spout communicating with the space above said material and terminating close to the container wall, and a portable receptacle for finished beverage disposed in vertical alignment with said spout and extending under said pipe into the space produced by its lateral disposition from the water heater.

6. In a beverage producer, a water heater, a container for granular beverage producing material adapted to receive hot liquid from said heater, an electrically actuated valve for controlling the delivery of liquid from said heater to said container, an electric heating element for the final beverage, and common means to automatically control the actuation of said valve and said heating element, said common means including a member operable between first and second positions by the final beverage produced, effective in the first position during the production of the beverage to maintain the electric heating element energized and the valve open, effective upon shifting from the first position to the second position to cause the closing of the valve, effective while in the second position to maintain the electric heating element energized and effective upon return from the second position to the first position to deenergize said electric heating element.

7. In a beverage producer, a water heater, a container for granular beverage producing material adapted to receive hot liquid from said heater, an electrically actuated valve for controlling the delivery of liquid from said heater to said container, an electric heating element for the final beverage, and common means operable by the final beverage produced to automatically control the actuation of said valve and said heating element, said common means including a member operable between first and second positions, effective in the first position during the production of the beverage to maintain the electric heating element energized and the valve open, effective upon shifting from the first position to the second position to cause the closing of the valve, effective while in the second position to maintain the electric heating element energized and effective upon return from the second position to the first position to deenergize said electric heating element, said member being actuated in response to the weight of the final beverage when a predetermined quantity has been delivered.

8. In combination, a water heater, a beverage producer adapted to receive hot liquid from said heater, an electrically actuated valve for controlling the delivery of liquid to said heater, a normally elevated downwardly movable support for receptacles receiving final beverage from said producer, an electric heater for receptacles resting upon said support, means operable by downward movement of said support for simultaneously closing said valve and for de-energizing said electric heater when a receptacle resting upon said support has been filled, and means for thereafter automatically re-energizing said heater and maintaining it energized while the beverage laden receptacle rests on said support.

9. In a beverage producer a water heater, a granular beverage producing material container adapted to receive hot liquid from said heater, an electrically actuated valve for controlling the delivery of liquid from said heater to said container, a support for receptacles receiving final beverage from said producer, said support being movable upwardly and downwardly, means for yieldably urging the support upwardly, an electric heater for receptacles resting upon the support, means operable by the downward movement of the support for simultaneously closing said valve, and for de-energizing said electric heater when a receptacle resting upon the support has been filled to a predetermined degree, and means for thereafter automatically re-energizing said heater when the support is subjected to continued influence of the weight of the filled receptacle.

10. In a beverage producer, a water heater, a granular beverage-producing material container adapted to receive hot liquid from said heater, a valve controlling the delivery of liquid from said heater to said container, beverage supporting mechanism including a yieldable support for a receptacle receiving final beverage from said container, said mechanism being so arranged that said support is movable under a predetermined weight of the receptacle and its contents, an electric heater for the receptacle resting on said support, manual control means operable to open said valve, and automatic control means common to said valve and said heater responsive to the movement of said receptacle support under influence of the weight of beverage in the receptacle for closing said valve and establishing an energizing circuit to said heater.

11. In a beverage producer, a water heater, a granular beverage-producing material container adapted to receive hot liquid from said heater, a valve controlling the delivery of liquid from said heater to said container, beverage supporting mechanism including a pivoted balance lever and a support carried by said lever for a receptacle receiving final beverage from said container, said mechanism being so arranged that said support is movable under a predetermined weight of the receptacle and its contents, an electric heater for the receptacle resting on said support, manual control means common to said valve and said heater effective when operated to open said valve and establish an energizing circuit to said heater, and automatic control means common to said valve and said heater responsive to the shifting of said support from an upper position to a lower position thereof under influence of the weight of beverage in the receptacle for closing said valve and establishing an alternative energizing circuit to said heater.

12. In a beverage producer, a water heater, a granular beverage-producing material container adapted to receive hot liquid from said heater, a valve controlling the delivery of liquid from said heater to said container, beverage supporting mechanism including a yieldable support for a receptacle receiving final beverage from said container, said mechanism being so arranged that said support is movable under a predetermined weight of the receptacle and its contents, an electric heater for the receptacle resting on said support, first control means common to said valve and said heater effective when operated to open said valve and establish an energizing circuit to said heater, and second control means common to said valve and said heater responsive to the movement of said receptacle support under influence of the weight of beverage in the receptacle for closing said valve and establishing an alternative energizing circuit to said heater.

13. In a beverage producer, a water heater, a granular beverage-producing material container adapted to receive hot liquid from said heater, an electrically actuated valve controlling the delivery of liquid from said heater to said container, beverage supporting mechanism including a yieldable support for a receptacle receiving final beverage from said container, said mechanism being so arranged that said support is movable under a predetermined weight of the receptacle and its contents, an electric heater for the receptacle resting on said support, control relay means common to said valve and said heater, a manual switch effective when actuated to energize said relay means thereby to open said valve and energize said heater, and automatic switch means responsive to the movement of said receptacle support under influence of the weight of beverage in the receptacle and effective when said support is shifted from an upper position to a lower position thereof to deenergize said relay means and energize said heater independently of said relay.

14. In a beverage producer, a stationary water heater having conduit means adapted for a pressure-tight connection with a fresh water supply, a discharge conduit communicating with said heater, a container for beverage-producing granular material connected to said discharge conduit and having a delivery spout, beverage supporting mechanism including a yieldable support for a dispensing receptacle positioned to receive the final beverage from the spout, said mechanism being so arranged that said receptacle support is movable under a predetermined weight of the receptacle and its contents, a valve controlling the flow of liquid from said heater to said container under the influence of the fresh water pressure, valve control means settable to an operative position to effect opening of said valve, holding means to retain said valve control means in its operative position, and restoring means responsive to movement of said support through a predetermined distance under the influence of the weight of beverage in the receptacle for nullifying the action of said holding means thereby to effect closure of said valve.

15. The combination set forth in claim 14, wherein said beverage supporting mechanism comprises a pivoted balance lever having an arm adapted to support the beverage receptacle.

16. In a beverage producer, a stationary water heater having conduit means adapted for a pressure-tight connection with a fresh water supply, a discharge conduit communicating with said heater, a container for beverage producing granular material connected to said discharge conduit and having a delivery spout, beverage supporting mechanism including a pivoted balance lever and a support carried by said lever for a dispensing receptacle positioned to receive the final beverage from the spout, a valve controlling the flow of liquid from said heater to said container under the influence of the fresh water pressure, means including a relay and a manual switch settable to energize said relay for opening said valve, contact means affording a holding circuit to maintain said relay energized, and switch means responsive to movement of said support under influence of the weight of beverage in the receptacle for interrupting said holding circuit to deenergize said relay.

HERBERT W. PETERS,
*Pro Se and as Assignee for Ambrose A. Peters, Deceased.*

REFERENCES CITED

The following references are of record in the file of this patent:

UNITED STATES PATENTS

| Number | Name | Date |
|---|---|---|
| 1,837,368 | Medin | Dec. 22, 1931 |
| 1,831,013 | Kouyoumjian | Nov. 10, 1931 |
| Re. 22,022 | Peters | Feb. 10, 1942 |
| 1,869,720 | Strand et al. | Aug. 2, 1932 |
| 2,013,172 | Petrone | Sept. 3, 1935 |
| 2,005,764 | Wilcox | June 25, 1935 |

FOREIGN PATENTS

| Number | Country | Date |
|---|---|---|
| 200,972 | Switzerland | Jan. 16, 1939 |
| 208,325 | Switzerland | May 16, 1940 |
| 558 | Great Britain | 1906 |
| 289,689 | Great Britain | May 3, 1928 |
| 396,982 | Great Britain | Aug. 17, 1933 |
| 380,414 | Great Britain | Sept. 16, 1932 |